United States Patent

[11] 3,532,126

[72] Inventor Willis A. Boothe
 Scotia, New York
[21] Appl. No. 679,770
[22] Filed Nov. 1, 1967
[45] Patented Oct. 6, 1970
[73] Assignee General Electric Company
 a corporation of New York

[54] GANGED VARIABLE FLUIDIC RESISTOR DEVICE
 18 Claims, 7 Drawing Figs.
[52] U.S. Cl............................................. 138/43,
 137/608, 137/614.11
[51] Int. Cl................................................ F15d 1/00,
 F15d 1/14
[50] Field of Search......................................... 138/41-
 —45, 39—40; 251/118—128; 137/614.11, 81.5, 608

[56] References Cited
UNITED STATES PATENTS

| | | | |
|---|---|---|---|
| 1,899,251 | 2/1933 | Zerk...................... | 138/41 |
| 2,021,079 | 11/1935 | Mittendorf et al......... | 138/42 |
| 2,118,290 | 5/1938 | Black...................... | 138/42 |
| 2,118,295 | 5/1938 | Crawford et al........... | 138/42 |
| 2,236,084 | 3/1941 | Taplin..................... | 138/43 |
| 2,506,179 | 5/1950 | Parish..................... | 138/43 |
| 2,784,741 | 3/1957 | Lee........................ | 138/42 |
| 3,323,550 | 6/1967 | Deeks..................... | 138/39 |
| 3,375,855 | 4/1968 | Burrows.................. | 251/127X |
| 3,434,500 | 3/1969 | Broun..................... | 138/42 |
| 2,833,311 | 5/1958 | Baldell.................... | 138/43 |
| 2,840,096 | 6/1958 | Bu Bois................... | 138/43X |
| 2,850,038 | 9/1958 | Shabaker................. | 138/43X |
| 3,148,703 | 9/1964 | Kachline.................. | 137/608 |
| 3,150,686 | 9/1964 | Kachline.................. | 137/608 |

FOREIGN PATENTS

| | | | |
|---|---|---|---|
| 1,243,778 | 9/1950 | France .................... | 138/42 |

Primary Examiner—Laverne D. Geiger
Assistant Examiner—Henry K. Artis
Attorneys—Paul A. Frank, Richard R. Brainard, Louis A. Moucha, Amerifus Mitchell, Frank L. Neuhauser, Oscar B. Waddell and Melvin M. Goldenberg

ABSTRACT: A laminar flow restriction device for obtaining ganged variable resistances to fluid flow therethrough. The device comprises a fluid tight structure of two outer members and a plurality of slotted laminates therebetween. The laminates include spaced slots of long, narrow equal dimension forming high resistance fluid flow passages and spaced holes for interconnecting the long slots in series circuit relationship. Means are provided for varying the positions of the spaced holes to thereby vary the effective lengths of the interconnected passages and thus vary the resistances to fluid flow therethrough in a perfect tracking arrangement.

Patented Oct. 6, 1970

Inventor:
Willis A. Boothe,

Patented Oct. 6, 1970
3,532,126
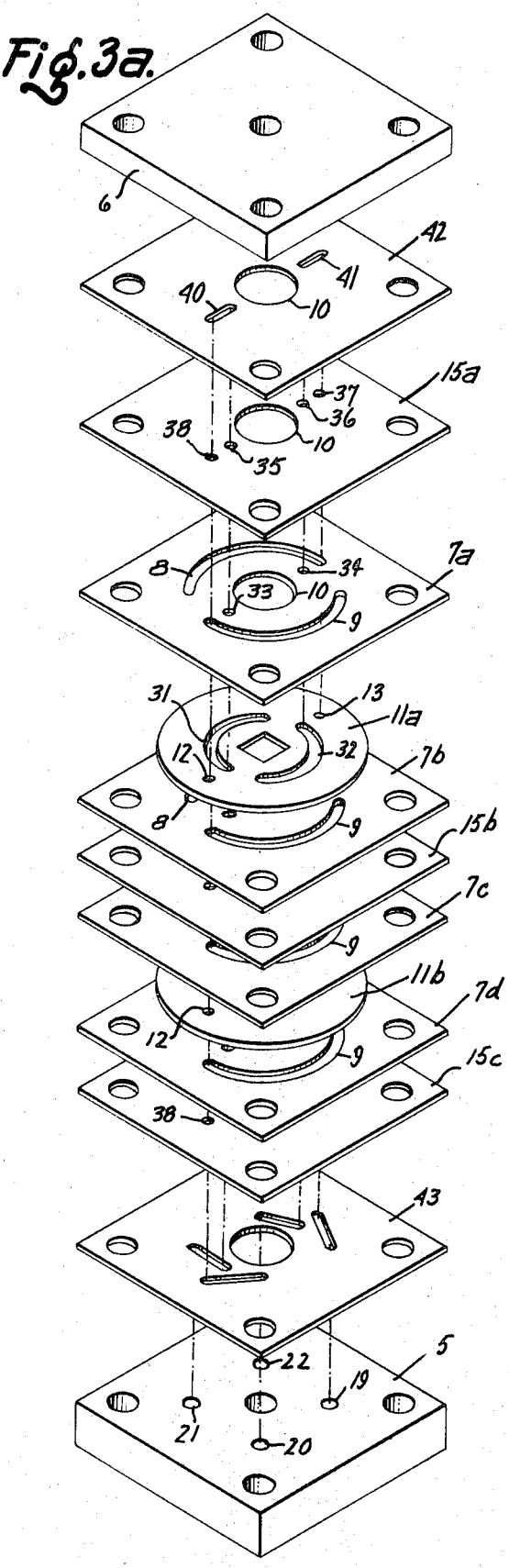
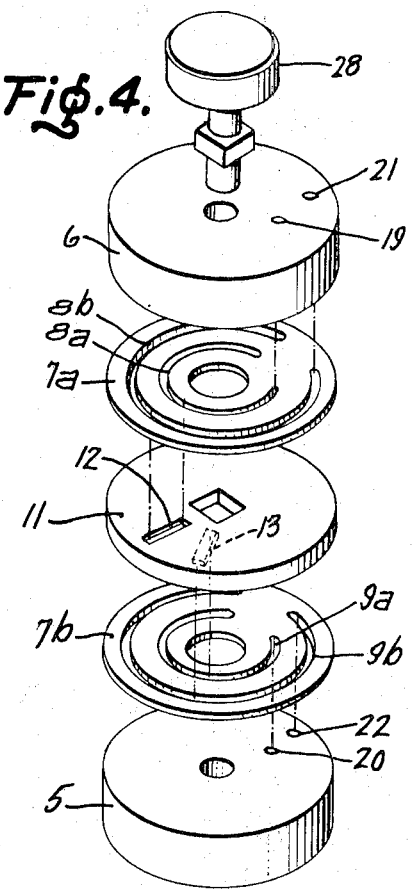
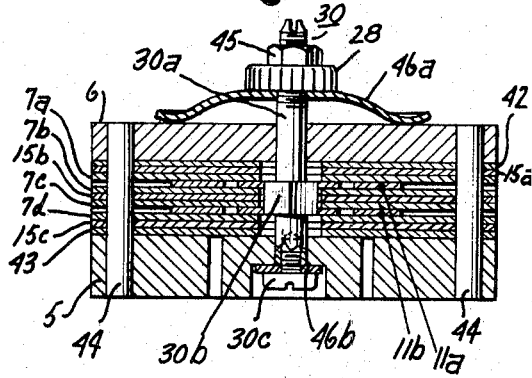
Inventor
Willis A Boothe
by Louis A. Moucha Inventor:
Willis A. Boothe,
by Louis A. Moucha

GANGED VARIABLE FLUIDIC RESISTOR DEVICE

My invention relates to devices providing variable resistance to fluid flow, and in particular to a ganged variable fluidic resistor device for obtaining perfectly tracking variable resistances by means of varying the path lengths of capillary passages.

In pure fluid systems of the type employing the recently developed control devices known as fluid amplifiers, a laminar flow restriction device providing a ganged arrangement of resistances to pressurized fluid flow is often an essential element. The need for these ganged fluidic resistors is especially important for obtaining predetermined gains and time constants within fluidic control systems utilizing analog computing circuits which are push–pull in configuration and operation, that is, utilize differential pressurized fluid input signals and provide differential output signals, such as the fluidic integrator, operational amplifier, and the like. Such push–pull circuits require matched pairs of fluidic resistors in each pair of input and feedback networks, the resistance values remaining matched when varied. The conventional means for varying the value of a fluidic resistance in a circuit is a substitution of resistors. Such technique is obviously time consuming and increases the risk of developing leaky connections in the fluidic circuit.

Therefore, the principal object of my invention is to provide a device comprising two or more ganged fluidic resistors whose resistances are equal and track perfectly when varied.

Another object of my invention is to provide a ganged fluidic resistor device wherein resistance values are varied inversely in equal amounts.

Briefly stated, my invention comprises a fluid tight device including a base member, a top member and a plurality of laminates positioned therebetween. The laminates include at least a first group keyed to the top and base members and each having a pair of spaced long, narrow equidimensioned slots formed therethrough and a second group free to rotate relative to the first group laminates and each having a pair of spaced holes therethrough. Laminates from the first and second groups are stacked and alternately arranged in slot alignment relationship such that fluid flow paths defined by the long slots and interposed bridging spaced holes in the assembled device define two separate long narrow fluid flow passages of the capillary type. Suitable means are provided for perfectly tracking the positions of the spaced bridging holes along the lengths of the fixed long slots to thereby controllably vary the effective lengths of each of the two separate fluid flow passages and thus vary the resistances to pressurized fluid flow therethrough. Inlet and outlet passages are provided in the base or base and top members in fluid communication with first ends of the long, narrow slots of the first group laminates.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

FIGS. 3a and 3b are perspective and side views, respectively, of a ganged device of the type shown in FIG. 1 but wherein the inlet and outlet passages are in the base member;

FIG. 4 is a perspective view of a ganged device of the type shown in FIG. 1 but wherein control of the effective lengths of the flow paths is over an arc approaching 360°.

Figure 1:
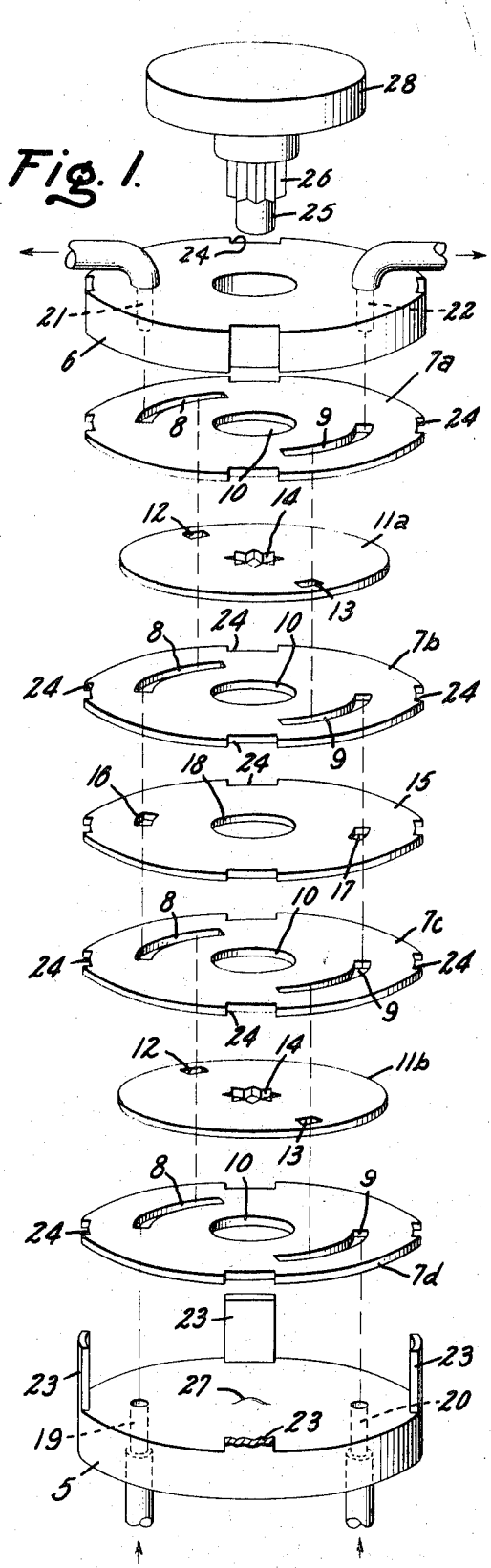
FIG. 1 is a perspective view of a ganged two variable fluidic resistor device prior to assembly and constructed in accordance with my invention.

Referring to FIG. 1, there is shown a first embodiment of my invention, and in particular, a ganged two variable fluidic resistor device wherein the elements thereof are in a superposed position to illustrate more clearly the elements prior to assembly. In particular, my device comprises a base member 5 which is the support for the device and also contains the inlet terminals thereof, a top member 6 which includes the outlet terminals, a plurality of laminates positioned therebetween, and a means for varying the effective lengths of fluid flow passages defined by slots within the laminates. Three groups of slotted laminates are employed in my FIG. 1 embodiment, the first group identified by numerals 7a, 7b, 7c, and 7d each having a pair of spaced, long, narrow slots 8 and 9 therethrough. This first group of laminates is also provided with central circular apertures 10 of equal diameter. Intermediate laminates 7a and 7b and also intermediate laminates 7c and 7d are positioned laminates 11a and 11b, respectively, forming a second group of laminates. Laminates 11a and 11b are each provided with a pair of accurately spaced apertures or holes 12 and 13 therethrough, such holes oriented to be in respective alignment with the long slots 8 and 9 in the first group of laminates as indicated by the dashed alignment lines. Laminates 11a and 11b are provided with central apertures 14 of smaller dimension than apertures 10 and are adapted to be keyed to a shaft 25 passing through the central apertures of all the laminates. A third group of laminates comprising laminate 15 is positioned between laminates 7b and 7c and is provided with spaced holes 16 and 17 therethrough which may be of identical shape as holes 12 and 13. Holes 16 and 17 are oriented to also be in respective alignment with long slots 8 and 9. A central circular aperture 18 in laminate 15 is of the same diameter as central apertures 10 and in alignment therewith. Inlet fluid flow passages 19 and 20 are disposed in base member 5 to be in respective fluid communication with first ends of slots 8 and 9 in laminate 7d and outlet fluid passages 21 and 22 in top member 6 are in respective fluid communication with similar first ends of such slots in laminate 7a, as indicated by the dashed alignment lines. Passages 19—22 may be provided with suitable couplings for connection into a fluidic circuit in which my device is an element thereof.

The laminates and members 5, 6 when aligned in the order illustrated in FIG. 1, and assembled in a fluid tight device have holes 12 and 13 in laminates 11a and 11b in respective fluid communication with slots 8 and 9 in the adjacent laminates and therefore functioning as bridging passages therebetween. Holes 16 and 17 in laminate 15 are in respective fluid communication with first ends of slots 8 and 9 in the adjacent laminates as indicated by the dashed alignment lines to provide further bridging passages. The first and third group laminates are of equal size, and in the assembled device are keyed to the base and top members 5 and 6 to prevent relative motion therebetween. Any suitable keying arrangement may be employed, a notch-ear combination being illustrated as one example wherein four ear members 23 projecting vertically upward from the sides of base member 5 securely engage notches 24 formed in corresponding sides of the first and third group laminates. The second group laminates are of smaller dimension to avoid engagement with ear members 23.

The long narrow slots 8, 9 in the first group laminates determine the sides of long, narrow high resistance fluid flow passages enclosed by the surfaces of adjacent laminates and the top and base members. The various elements of my device are preferably constructed of metal, and as one example, the top and base members are fabricated of anodized aluminum and the laminates fabricated from beryllium copper and stainless steel. The materials from which the various elements are fabricated are dependent on the environment of device operation, and the materials must necessarily be nonporous to and nonreactive with the fluid medium employed, and be adapted for precision machining or etching to obtain accurately dimensioned slots within the laminates and well mating surfaces of the laminates and top and base members to prevent fluid leakage of the assembled device in operation. For ease and low cost of fabrication, the fluid passages comprising my fluidic resistor are rectangular or square in cross section, it being obvious that other cross-sectional shapes may be employed, if desired, at higher manufacturing costs. The flat mating surfaces of the various elements of my device are machined to have a flatness preferably well within .001 inch to insure fluid tight mating of these surfaces upon assembly of the device.

In a preferred embodiment of my invention as illustrated in FIG. 1, the laminates and top and base members are round in shape when looking down at the device. Obviously, other shapes can be employed, if desired, or required by the particular application. The long, narrow slots 8 and 9 are circular arcs in the lengthwise dimension, such circular arrangement of slots being preferred over linear slots to make the most effective use of an area having minimum over-all dimensions. The cross-sectional dimensions of slots 8 and 9 are sufficiently small, and the lengths are sufficiently long to obtain capillary-type passages providing laminar flow restrictions to the pressurized fluid flowing therethrough. The width of the slots are generally in the range of 0.002 to 0.100 inch and are generally greater than the depth (laminate thickness) dimension; the particular width, depth, and circular arc length thereof, as well as the total number of laminates being determined by the range of resistances to pressurized fluid flow therethrough for which the particular device is constructed. In the case of my perfectly tracking ganged two resistor device utilizing the curved slots 8 and 9 illustrated, such slots are located along a common radius from the laminate center and are defined by circular arcs subtended by angles of less than 180°, and for ease of fabrication, have maximum arcs of approximately 160° each.

The inlet and outlet passages formed through base and top members 5 and 6, respectively, are of diameter at least as wide as slots 8 and 9, and preferably have a greater width dimension such that the device resistance path is determined almost exclusively by the long slots 8, 9. In the most simplified resistor, slots 8 and 9 are each of equal and constant cross section to thereby provide a fluidic resistor having a linear weight flow versus pressure characteristic. The circular lengths of slots 8 and 9 are equal in a device obtaining two perfectly tracking resistors which are ganged such that their resistances remain equal when varied. My resistor device may also provide a nonlinear weight flow versus pressure characteristic and thereby operate as a function generator by forming slots 8 and 9 with variable cross section, the particular nonlinear characteristic being determined by the specific geometry of the slots. In like manner, slots 8 and 9 may be of unequal lengths or widths to provide a selected ratio of fluid resistances.

The long slots 8, 9 (hereinafter also referred to as fluid passages) in the first group laminates are interconnected by the holes (passages) 12, 13 and 16, 17 in the second and third group laminates. Holes 16, 17 remain fixed in position at the first ends of the long slots but holes 12, 13 are adapted to be in adjustable bridging relationship with respect to the long slots to thereby vary the effective lengths thereof relative to the inlet and outlet passages. The adjustable bridging relationship is obtained by a relative movement between the second and first group laminates. In the particular FIG. 1 embodiment, the relative movement is a rotational motion of the second group laminates obtained by rotation of shaft 25 to which the second group laminates are keyed. Due to this rotation, the second group laminates are preferably of thicker construction than the first group for added bearing strength. These second group laminates are keyed to shaft 25 by means of laminate central apertures 14 being serrated for engagement with the spline 26 on shaft 25, as one illustrated example. Another typical keying arrangement may utilize a rib formed longitudinally along shaft 25 and corresponding keyways in the circular apertures 14 for engagement with the rib. Many other keying arrangements such as that illustrated in FIG. 3 may also be employed. A knob 28 is connected to the top end of shaft 25 or formed as a part thereof for convenience in manual rotation of the shaft. It should be apparent that the alignment mechanism for the first and third group laminates is provided by the keying arrangement 23—24 whereas the alignment mechanism for the second group laminates is provided by the keying arrangement on shaft 25 and a journal or other form of shaft bearing 27 in the central top surface of base member 5. The laminates and top and base members are retained in fluid-tight assembly in any suitable manner, as one example, the ear members 23 being formed into adjustable lugs at the top ends thereof for adjustable engagement with the top surface of top member 6. Finally, any suitable means such as one or more holes through my device parallel to the longitudinal axis may be provided, as desired, for mounting the assembled device on a suitable support.

Upon assembly of the various elements hereinabove described, my fluidic resistor device provides a laminar flow restriction to pressurized fluid flow therethrough, the particular resistance to the fluid flow being determined by the dimensions of passages 8 and 9, the relative location of bridging passages 12 and 13 and the number of first group laminates. The total resistance may obviously be increased by stacking additional laminates between enclosing members 5 and 6 in the order illustrated in FIG. 1 and may be decreased by removing at least laminates 15, 7c, 11b and 7d. Additional third group laminates may be inserted between top member 6 and laminate 7a and between laminate 7d and base member 5 for more precise coupling between the first ends of passages 8, 9 and the associated inlet and outlet passages 19—22. For small resistance values wherein the effective length of passages 8 and 9 are very short, such passages approach orifice type restrictions and the fluid flow therethrough may become nonlaminar, but this is not a limitation of my invention.

Resistance value is varied by loosening the member(s) retaining my device in fluid tight assembly, rotating knob 28 to a new setting corresponding to the new desired position of bridging holes 12 and 13 relative to slots 8 and 9, respectively, and then tightening the retaining members. Knob 28 may be provided, if desired, with a stop mechanism (not shown) to limit the rotational travel of shaft 25 in one or both directions. Thus, knob 28 may be limited for counterclockwise rotation whereby bridging holes 12 and 13 are limited in travel at the first ends of slots 8 and 9, respectively, and may also be limited in the clockwise direction at the second ends of slots 8 and 9. The fluid flow paths for the two ganged resistors is from terminals 19 to 21 and from terminals 20 to 22. In particular, the flow path from terminals 19 to 21 is through (all or part of) slot 8 in laminate 7d, upward through hole 12 in laminate 11b, through (all or part of) slot 8 in laminate 7c, upward through slot 16 in laminate 15, through (all or part of) slot 8 in laminate 7b, upward through hole 12 in laminate 11a and through (all or part of) slot 8 in laminate 7a. It is evident from the FIG. 1 drawing that maximum resistances to fluid flow are obtained at the extreme clockwise setting of knob 28 (in which apertures 12 and 13 are in bridging communication with the second ends of all passages 8 and 9, respectively) since this provides the maximum effective length fluid flow paths from inlet 19 to outlet 21 and from inlet 20 to outlet 22 by including the total lengths of passages 8 and 9. The minimum resistance values are obtained at the extreme counterclockwise setting of bridging passages 12 and 13 wherein minimum effective length fluid flow paths are thence provided between the inlets and outlets. A ratio of maximum-to-minimum resistance of at least 50:1 is readily available with my device. Since passages 8 and 9 have predetermined dimensions, the value of the resistance to fluid flow therethrough can be determined and the maximum and minimum values of resistance are thus known. In like manner, values of resistance between the maximum and minimum may readily be predetermined and various resistance values (or at least the extreme values or extreme knob 28 positions) may be indicated with an appropriate indicia-indicator arrangement provided on knob 28 and top member 6, if desired.

Thus, it is evident that the structure of my FIG. 1 embodiment provides a relatively compact variable fluidic resistor device providing two perfectly tracking ganged resistors whose resistances remain equal when varied. The accuracy of the resistance values obtained is very high and is obviously governed by the precision with which slots 8 and 9 are formed.

Figure 2:
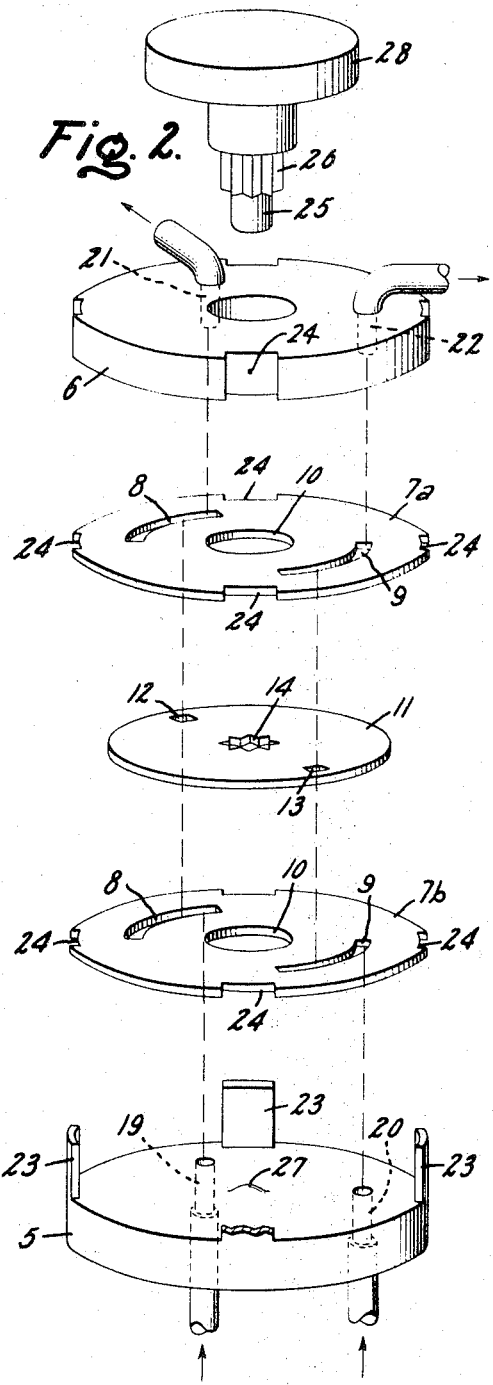
FIG. 2 is a perspective view of a ganged device of the type shown in FIG. 1 but wherein the resistance values are varied inversely in equal amounts.

A second embodiment of my invention is illustrated in FIG. 2 and is comprised of the same type elements as the FIG. 1 embodiment, although a lesser number of laminates are employed to thereby obtain a smaller total resistance (assuming equal dimensioned slots in both embodiments). The distinctive feature of the FIG. 2 embodiment is the relative orientation of the inlet and outlet passages with respect to slots 8 and 9 in laminates 7a and 7b. As indicated by the dashed alignment lines, the inlet and outlet passages are in fluid communication with different ends of passages 8 as compared to the orientation in the FIG. 1 embodiment. Thus, in the FIG. 1 embodiment the inlet and outlet passages are in communication with the ends of slots 8 and 9 identified as first ends whereas in FIG. 2 embodiment only the first ends of slots 9 are in communication with inlet and outlet passages 20 and 22, respectively, whereas inlet and outlet passages 19 and 21 are in communication with the second ends of slots 8. This distinguishing feature of my FIG. 2 embodiment results in a perfectly tracking push–pull ganged arrangement of two-variable fluidic resistors in that a clockwise rotation of knob 28 (and laminate 11 keyed thereto) causes an effective shortening of interconnected slots 8 in laminates 7a and 7b and an equal increment effective lengthening of interconnected slots 9. In like manner, a counterclockwise rotation of knob 8 results in the opposite effect. Thus, my FIG. 2 embodiment is suitable for use as a rotary position transducer or an adjustable push–pull bias in that the value of one fluidic resistance is increased and the other decreased an equal amount for all positions of knob 28.

In the FIGS. 1 and 2 embodiments, the inlet and outlet terminals are located in base and top members 5 and 6, respectively. Many applications find it desireable to locate all of the terminals in one of the enclosing members 5 or 6. A third embodiment illustrated in FIGS. 3a and 3b provides all such terminals in base member 5. My FIG. 3a embodiment is comparable with FIG. 1 in that it includes the same plurality of first and second group laminates between base member 5 and top member 6. In particular, my FIG. 3a embodiment includes first group laminates 7a, 7b, 7c and 7d each provided with long, circular, high resistance slots 8 and 9 circumferentially spaced from each other. Each of these first group laminates also includes two apertures or holes 33, 34 therethrough for purposes to be described hereinafter and a central circular aperture 10 for passage of a hold down screw 30 therethrough. The second group laminates 11a and 11b which are located between laminates 7a, 7b and laminates 7c, 7d, respectively, are provided with the short bridging passages (apertures) 12 and 13 for interconnecting two slots 8 and two slots 9 in adjacent laminates in the manner of the FIG. 1 embodiment. The second group laminates 11a and 11b also include two additional long, broad slots 31 and 32 of equal dimension and circumferentially spaced from each other. Slots 31, 32 are located on the same radius from the laminate centers as apertures 33, 34, and are preferably located on a smaller radius than apertures 12, 13 to permit maximum length slots 8, 9 in the first group laminates. Slots 31 and 32 form low resistance bridging passages between adjacent holes 33 and between adjacent holes 34, the long dimension of slots 31, 32 being necessitated by the fact that the second group laminates are rotatable relative to the first group laminates.

The third group of laminates in my FIG. 3a embodiment correspond to the third group laminate (15) in the FIG. 1 embodiment and comprises laminates 15a, 15b and 15c shown positioned immediately above laminates 7a, 7c and below 7d, respectively. These third group laminates include four apertures 35, 36, 37, 38 therethrough in respective alignment with holes 33, 34 and first ends of slots 8 and 9 in the first group laminates. Holes 35 and 38 in laminate 15a are also in alignment with opposite ends of a crossover passage 40 in laminate 42, and holes 36 and 37 are in alignment with opposite ends of crossover passage 41. Laminate 42 is positioned between top member 6 and laminate 15a, and the crossover passages therein reverse the direction of the flow paths in the assembled device to direct the flow back down toward the outlet terminals 21 and 22. The return path to the outlet terminals is downward through the inner radius slotted path comprising holes and slots 35, 33, 31, 33, 35, 33, 31, 33 and 35 in laminates 15a, 7a, 11a, 7b, 15b, 7c, 11b, 7d and 15c, respectively, for the resistance defined by slots 8. In like manner the return path for the resistance defined by slots 9 comprises holes and slots 36, 34 and 32. A final laminate 43 is positioned between laminate 15c and the base member 5 and includes the four low resistance slots therethrough, the slots having first ends aligned with apertures 35, 36, 37 and 38 in laminate 15c and second ends aligned respectively with the inlet, outlet terminals 21, 22, 19 and 20 in base member 5. The four slots in laminate 43 provide a convenient means for locating the inlet (19, 21) and outlet (20, 22) terminals in the base member 5.

The laminates in the FIG. 3a device may be aligned and retained in fluid tight assembly in any suitable manner such as the means described with reference to FIG. 1, however, for purposes of further example, base and top members 5 and 6 and all the laminates except the second group 11a, 11b are provided with four holes in the corners thereof for the insertion of dowels 44 or other type pins therethrough to prevent rotation of such laminates relative to the top and base members as shown in the assembled sectional side view of FIG. 3b. Such means could also be utilized for retaining the fluid tight assembly. All the laminates except the second group, and the top and base members are indicated as being square in shape looking downward at the device, the second group laminates being conveniently circular in shape. Square central apertures of equal dimension are provided in the second group laminates and circular central apertures of equal dimension having diameters greater than the diagonal dimension of the square apertures in the second group laminates are provided in the remaining laminates. Smaller circular central apertures are provided in the top and base members and hold down screw 30 passes through all of the central apertures as illustrated in the FIG. 3b. Hold down screw 30 is a two member device comprising an upper (as illustrated) shank member 30a externally threaded along the upper outer portion thereof and internally threaded along a lower hollow portion thereof. Shank member 30a is engaged by lock nut 45 and knob 28 and has a slot at the uppermost end thereof. Shank member 30a is also provided with a square portion 30b of width dimensions corresponding to the square apertures in the second group laminates and a height dimension slightly less than the sum of the thicknesses of all the laminates. The square portion 30b engages the sides of the square central apertures in laminates 11a, 11b and thus provides the means for varying the position of bridging passages 12 and 13 upon rotation of knob 28. The second member of hold down screw 30 comprises a lower head member 30c externally threaded along an upper portion thereof for screwing into the hollow portion of member 30a. Any sealing arrangement such as gaskets and washers including the illustrated spring washer 46a and washer 46b may be employed to obtain a fluid tight assembly of my device.

The plurality of laminates illustrated in my FIGS. 1, 2 and 3 embodiments obtain perfectly tracking ganged fluidic resistors throughout their complete range of resistance values. Although increased resistance may be obtained by stacking further laminates between the enclosing members 5 and 6 in each of the above embodiments, in some cases it may be preferred to limit the height (and width) of the stacked laminates and in such instance the embodiment illustrated in FIG. 4 may be employed. In the FIG. 4 embodiment, two perfectly tracking fluidic resistors each having an identical high maximum resistance value are obtained by forming one resistor of spaced, long, narrow, concentric passages 8a, 8b in one laminate 7a and the second resistor of identical concentric passages 9a, 9b in the second laminate 7b. Thus, a more efficient use of the space on each laminate is utilized for the slotted resistance passages as compared to the merely circumferentially spaced circular passages in the FIGS. 1, 2 and 3 embodiments. In FIG. 4, laminates 7a and 7b are disposed adjacent and keyed to top member 6 and bottom member 5, respectively, and laminate 11 positioned between laminates 7a and 7b is keyed for rotation with knob 28. The inlet 19 and outlet 21 passages for the resistor defined in laminate 7a are provided in top member 6 and are aligned with first ends of slots 8a, 8b. In like manner, inlet 20 and outlet 22 passages for the resistor defined in laminate 7b are located in base member 5 in alignment with first ends of slots 9a, 9b. Bridging slots (passages) 12 and 13 are respectively located in the upper and lower surfaces of laminate 11. The short slots 12 and 13 are preferably slightly circumferentially spaced from each other for convenience in machining. The slight circumferential spacing of the bridging passages requires that the ends of the concentric passages in laminates 7a and 7b also be circumferentially spaced from each other a like amount. Thus, circular concentric slots 8a and 8b in laminate 7a have first ends thereof in respective fluid communication with inlet 19 and outlet passages 21 in top member 6 as indicated by the dashed alignment lines, and have second ends thereof located along a common radial line emanating from the center of laminate 7a. In like manner, circular concentric slots 9a and 9b in laminate 7b have first ends thereof in respective fluid communication with inlet 20 and outlet 22 passages in base member 5, and have second ends thereof along a common radial line. Slots 8a, 8b, 9a and 9b are of equal cross-sectional dimension, in the general case, slots 8a and 9a being of equal length and located on a first common radius, and slots 8b and 9b of equal length and located on a second common radius to thereby provide the equal resistances to fluid flow in each of the resistors. In the maximum (resistance) clockwise position of knob 28, bridging passage 12 is located at the second ends of slots 8a and 8b and bridging passage 13 is located at the second ends of slots 9a and 9b. Equal lower resistances are obtained by counterclockwise rotation of the knob. Thus, a ganged pair of perfectly tracking fluidic resistors is obtained in my FIG. 4. All of the inlet and outlet terminals may be formed in the top or base member by employing additional laminates in the manner of the FIG. 3a embodiment. The specific means for keying rotatable laminate 11 to knob 28 and the means for retaining the assembled device in fluid tight communication is not illustrated in FIG. 4 since such means may be any of a number of known mechanisms some of which have been indicated hereabove. The resistance paths in the FIG. 4 embodiment may obviously be extended by stacking additional laminates in the device and utilizing serial connections between laminates in a manner similar to that disclosed in FIGS. 1, 2 and 3. Thus, my FIG. 4 embodiment obtains fluidic resistors wherein control of the resistance value for each resistor is obtained over an arc approaching 360° as opposed to the arc of less than 180° in the FIGS. 1, 2 and 3 embodiments and therefore provides a greater degree of adjustment of the selected resistance value.

Figure 5A:
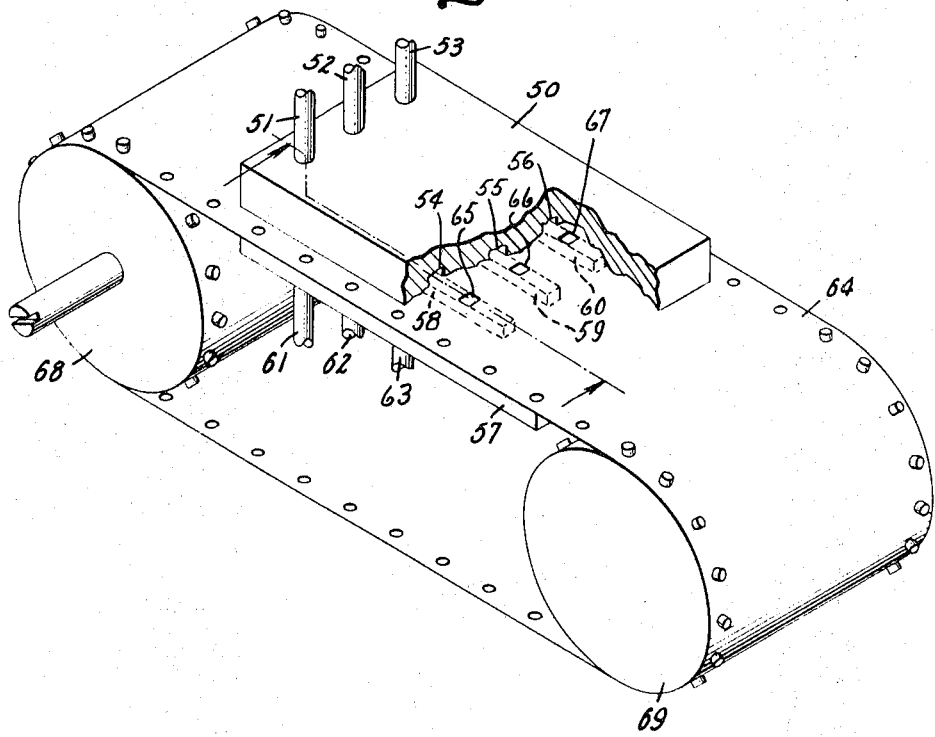
FIGS. 5a and 5b are perspective and enlarged cross-sectional views, respectively, of a multiganged variable fluidic resistor device.
Figure 5B:
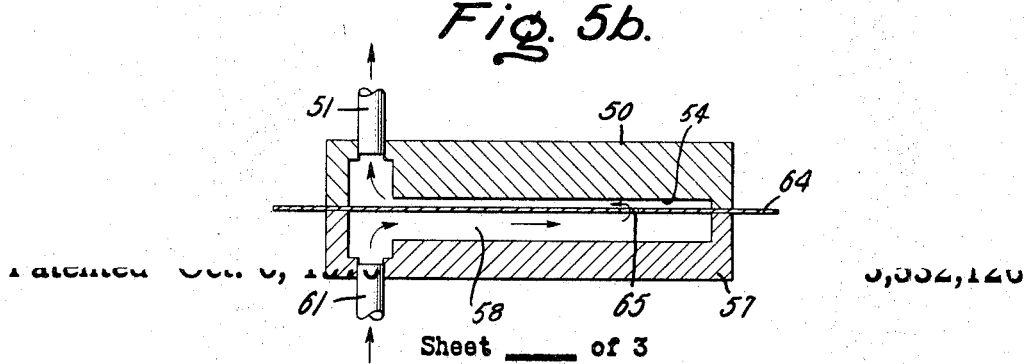

A device for obtaining a perfectly tracking ganged arrangement of three or more fluidic resistors is illustrated in FIGS. 5a and 5b. The FIG. 5a embodiment is further distinguished from the previous embodiments in that the resistance flow paths are linear rather than circular. In particular, my FIG. 5a device comprises a top member 50 provided with a plurality of parallel inlet passages 51, 52 and 53 and a corresponding number of long, narrow, parallel linear slots 54, 55 and 56 having first ends respectively in fluid communication therewith. As illustrated in the perspective, partly sectioned view of FIG. 5a and the enlarged cross-sectional view of FIG. 5b, top member 50 is rectangular in shape and relatively long in the lengthwise dimension to provide long length resistance paths therein. The sectional view of FIG. 5b is taken on a line through inlet passage 51 and slot 54 in communication therewith. Slots 54, 55 and 56 are formed in the bottom surface of member 50 and are equally dimensioned in width, depth and length to thereby provide equal high fluidic resistances. A bottom member 57 includes low fluidic resistance plenum slots 58, 59 and 60 which are respectively aligned with high resistance slots 54, 55 and 56. Slots 58, 59 and 60 could also be high resistance slots to increase the device resistance, if desired. A corresponding number of outlet passages 61, 62 and 63 are in respective fluid communication with first ends of the corresponding plenum (or high resistance) slots 58, 59 and 60. A movable member 64 is positioned between top and bottom members 50 and 57 and is provided with three spaced apertures 65, 66 and 67 aligned transversely of the longitudinal axes of the high resistance slots 54, 55, 56. Each of apertures 65, 66 and 67 is aligned with a corresponding high resistance slot 54, 55, 56 and low resistance plenum (or high resistance) slot 58, 59, 60 to provide fluid communication therebetween. The transversely aligned apertures 65, 66 and 67 and equally dimensioned high resistance slots 54, 55 and 56 thus provide a ganged arrangement of three perfectly tracking variable fluidic resistors which have equal resistance along the entire lengths of the high resistance slots. The assembly of top member 50, intermediate bridging passage member 64 and bottom member 57 is retained in fluid tight assembly by any suitable means (not shown) for a particular position of member 64. The plurality of fluidic resistances are equally changed in value by varying the position of member 64, and thus the positions of crossover passages 65, 66 and 67 therein, in the longitudinal direction in any convenient manner, a particular example illustrated in FIG. 5a comprising member 64 as a tape moved in the longitudinal direction by sprocket wheels 68 and 69. The fluid flow path for each variable fluidic resistor is thus seen to be from an inlet passage through a portion, or total length of the high resistance slot in top member 50, through an aperture in tape 64 and back through the low resistance plenum slot to an outlet passage. Variations of my FIG. 5a embodiment are obvious in view of the first four embodiments, namely, that top member 5 may be comprised of a plurality of laminates having high resistance slots in some of the laminates, interconnecting fixed position slots in other laminates, and a plurality of movable bridging slots to connect the high resistance slots in serial relationship to obtain very long fluidic resistance paths.

The FIGS. 1, 2 and 3 embodiments could obviously be modified to provide a ganged arrangement of more than two resistors by (1) decreasing the lengths of long narrow slots 8, 9 and (2) providing additional bridging slots in the second and third group laminates and (3) providing additional inlet and outlet passages in the enclosing members 5, 6.

As a specific example of the dimensions employed in my ganged variable fluidic resistor device, a device of the type illustrated in FIGS. 3a and 3b is fabricated from a first group of laminates (7a, 7b, 7c and 7d) having a thickness of .004 inch, and a length and width of one inch each, high resistance slots 8 and 9 each being approximately 0.70 inch long and .020 inch wide whereas the second group laminates (11a, 11b) each have a thickness of .020 inch and diameter of 0.80 inch, and low resistance plenum slots 31 and 32 are approximately 0.40 inch long and .030 inch wide.

From the foregoing description, it can be appreciated that my invention makes available a new ganged variable fluidic resistor device which has perfect tracking over the entire range of resistance values and thus is a most accurate device in operation. The device may be employed in a fluidic circuit and the resistance varied without removing the device from the circuit since a change in resistance value is obtained by merely loosening a retaining member and thence rotating or otherwise moving a member having bridging passages therein to the desired position of the requisite resistance value. The ganged variable fluidic resistor device is especially well adapted for use in circuits utilizing differential pressurized fluid signals since two perfectly matched fluidic resistances are ganged and perfectly tracked by my invention.

Having described five embodiments of my ganged variable fluidic resistor device, it is believed obvious that modification and variation of my invention is possible in the light of the above teachings. Thus, any means for retaining my device in fluid tight assembly and for varying the effective length of the resistance paths therein may be employed. It is, therefore, to be understood that changes may be made in the particular embodiments as described which are within the full intended scope of my invention as defined by the following claims.

I claim:

1. A ganged variable fluidic resistor device comprising:

stationary first fluid passage means for providing first restrictions to pressurized fluid flow therethrough;

stationary second fluid passage means spaced from said first passage means and noncoplanar therewith for providing second restrictions to pressurized fluid flow therethrough; and movable third fluid passage means disposed between said stationary first and second means in adjustable bridging relationship therewith for adjustably interconnecting said first and second fluid passage means in series circuit relationship along selected lengths thereof to thereby selectively vary the effective lengths thereof and thereby selectively vary the resistances to fluid flow therethrough upon predetermined movement of said third means and provide a ganged arrangement of variable fluidic resistors.

2. The ganged variable fluidic resistor device set forth in claim 1 wherein:

said first fluid passage means comprise a plurality of spaced first long narrow fluid passages having predetermined dimensions;

said second fluid passage means comprise a like plurality of spaced second long narrow fluid passages having predetermined dimensions; and said third fluid passage means comprise at least one member having the same plurality of spaced apertures therethrough as the plurality of first long narrow passages, each aperture in fluid communication with one of said first and second long narrow passages to provide the bridging relationship for interconnecting said first and second passage means along selected lengths thereof, and further comprising means for rotatably varying the position of said at least one member relative to said first and second passage means to thereby selectively vary the position of said apertures along the lengths of said first and second long narrow passages and thereby selectively vary the effective lengths thereof.

3. The ganged variable fluidic resistor device set forth in claim 1 wherein:

said first fluid passage means comprise a plurality of spaced first long narrow fluid passages having predetermined dimensions;

said second fluid passage means comprise a like plurality of spaced low resistance second fluid passages; and said third fluid passage means comprise a single member having the same plurality of spaced apertures therethrough as the plurality of first long narrow passages, each aperture in fluid communication with one of said first long narrow passages and one of said low resistance second passages to provide the bridging relationship for interconnecting said first and second passage means along selected lengths thereof, and further comprising means for rectilinearly varying the position of said member relative to said first and second passage means to thereby vary the position of said apertures along the lengths of said first and second passages and thereby vary the effective lengths thereof.

4. The ganged variable fluidic resistor device set forth in claim 1 wherein:

said first fluid passage means comprise a pair of spaced first long narrow fluid flow passages having predetermined dimensions;

said second fluid passage means comprise a pair of spaced second long narrow fluid flow passages having predetermined dimensions; and said third fluid passage means comprise a member having a pair of spaced short slots on opposite sides thereof, a first of said pair of short slots in fluid communication with said pair of first long narrow passages and a second of said pair of short slots in fluid communication with said pair of second long narrow passages to provide the bridging relationship for interconnecting said first and second passage means along the lengths thereof, and further comprising means for rotatably varying the position of said member relative to said first and second passage means to thereby selectively vary the position of said short slots along the lengths of said first and second long narrow passages and thereby selectively vary the effective lengths thereof.

5. The ganged variable fluidic resistor device set forth in claim 2 wherein:

said first fluid passage means comprise a first member provided with a first pair of spaced long narrow fluid flow passages having predetermined dimensions;

said second fluid passage means comprise a second member provided with a second pair of spaced long narrow fluid flow passages having predetermined dimensions;

said third fluid passage means comprise a third member provided with a pair of spaced apertures therethrough, a first of said apertures in fluid communication with first passages of each said first and second pairs of long narrow passages and a second of said apertures in fluid communication with second passages of each said first and second pairs of long narrow passages to provide the bridging relationship for interconnecting said first and second passage means along the lengths thereof; and said position varying means comprise means for rotatably varying the position of said third member relative to said first and second members to thereby selectively vary the position of said apertures along the lengths of said first and second pairs of long narrow passages and thereby selectively vary the effective lengths thereof, and further comprising enclosing means having inlet and outlet fluid flow passages in fluid communication with first ends of said first and second pairs of long narrow passages to obtain a perfectly tracking ganged arrangement of two variable fluidic resistors having resistances remaining equal when varied. said enclosing means adapted to retain the assembled device in fluid tight relationship 6. The ganged variable fluidic resistor device set forth in claim 2 wherein:

said first fluid passage means comprise a first member provided with a first pair of spaced long narrow fluid flow passages having predetermined dimensions;

said second fluid passage means comprise a second member provided with a second pair of spaced long narrow fluid flow passages having predetermined dimensions;

said third fluid passage means comprise a third member provided with a pair of spaced apertures therethrough, a first of said apertures in fluid communication with first passages of each said first and second pairs of long narrow passages and a second of said apertures in fluid communication with second passages of each said first and second pairs of long narrow passages to provide the bridging relationship for interconnecting said first and second passage means along the lengths thereof; and said position varying means comprise means for rotatably varying the position of said third member relative to said first and second members to thereby selectively vary the position of said apertures along the lengths of said first and second pairs of long narrow passages and thereby selectively vary the effective lengths thereof, and further comprising enclosing means having first inlet and outlet fluid flow passages in fluid communication with first ends of said first passages of each said first and second pairs of long narrow passages and having second inlet and outlet fluid flow passages in fluid communication with second ends of said second passages of each said first and second pairs of long narrow passages to obtain a perfectly tracking ganged arrangement of two variable fluidic resistors having one resistance increase and the other decrease an equal amount when varied, said enclosing means adapted to retain the assembled device in fluid tight relationship.

7. The ganged variable fluidic resistor device set forth in claim 2 wherein:
said first fluid passage means comprise a plurality of first members each provided with a first pair of spaced long narrow fluid flow passages having predetermined dimensions;
said second fluid passage means comprise a like plurality of second members each provided with a second pair of spaced long narrow fluid flow passages having predetermined dimensions; and
said third fluid passage means comprise a like plurality of third members each provided with a first pair of spaced apertures therethrough, at least one fourth member provided with a second pair of spaced apertures therethrough,
the assembled device comprising at least one superposed arrangement of a first said first member, a first said third member, a first said second member, said fourth member, a second said first member, a second said third member and a second said second member in the order recited in a fluid tight assembly wherein corresponding ones of each pair of spaced long narrow passages and apertures are in fluid communication to provide the bridging relationship for interconnecting said first and second passage means along the lengths thereof,
said position varying means comprise means for rotatably varying the position of said third member relative to said first, second and fourth members to thereby selectively vary the position of said third member apertures along the lengths of said first and second pairs of long narrow passages and thereby selectively vary the effective lengths thereof, and further comprising
enclosing means on both ends of the assembled device having a pair of inlet passages and a pair of outlet passages in fluid communication with first ends of the long narrow passages in adjacent members, said enclosing means adapted to retain the assembled device in fluid tight relationship.

8. The ganged variable fluidic resistor device set forth in claim 7 wherein
said enclosing means comprise:
a fifth member provided with a pair of inlet fluid flow passages in fluid communication with first ends of said second pair of long narrow passages in the second said second member; and
a sixth member provided with a pair of outlet fluid flow passages in fluid communication with first ends of said first pair of long narrow passages in the first said first member.

9. The ganged variable fluidic resistor device set forth in claim 7 wherein
said enclosing means comprise:
a fifth member adjacent the second said second member and provided with a pair of inlet and a pair of outlet fluid flow passages in fluid communication with first ends of said first pair of long narrow passages in the first said first member and with first ends of said second pair of long narrow passages in the second said second member; and
a sixth member adjacent the first said first member, and means in fluid communication with each of said first, second, third and fourth members for providing a fluid path from the first ends of said first pair of long narrow passages in the first said first member to said fifth member.

10. The ganged variable fluidic resistor device set forth in claim 2 wherein
said first and second long narrow passages have equal dimensions.

11. The ganged variable fluidic resistor device set forth in claim 2 wherein
said first and second long narrow passages have unequal dimensions.

12. The ganged variable fluidic resistor device set forth in claim 2 wherein
said first and second long narrow passages are each of constant cross section to provide a ganged arrangement of variable fluidic resistors each having a linear weight flow versus pressure characteristic.

13. The ganged variable fluidic resistor device set forth in claim 2 wherein
said first and second long narrow passages are each of variable cross section to provide a ganged arrangement of variable fluidic resistors each having a nonlinear weight flow versus pressure characteristic, the particular nonlinear characteristic being determined by the specific geometry of said first and second long narrow passages.

14. The ganged variable fluidic resistor device set forth in claim 2 wherein
said first and second long narrow passages are each of circular shape.

15. The ganged variable fluidic resistor device set forth in claim 3 wherein
said first and second passages are each of linear shape.

16. The ganged variable fluidic resistor device set forth in claim 2 wherein
said first and second long narrow passages are rectangular in cross section.

17. The ganged variable fluidic resistor device set forth in claim 16 wherein
said first and second long narrow passages each have a width in the range of 0.002 to 0.100 inch and a depth less than the width dimension to obtain a rectangular cross section of small area resulting in high resistance fluid flow passages.

18. The ganged variable fluidic resistor device set forth in claim 2 wherein
said first and second long narrow fluid passages are sufficiently small in cross section to provide laminar flow restrictions.